United States Patent [19]

Paikert et al.

[11] Patent Number: 5,094,826

[45] Date of Patent: Mar. 10, 1992

[54] METHOD AND ARRANGEMENT FOR THE DENITRIFICATION AND DESULFURIZATION OF HOT WASTE GASES, PARTICULARLY FROM FURNACES

[75] Inventors: Paul Paikert, Witten; Clemens Ruff, Bochum; Ludwig Suhr, Essen, all of Fed. Rep. of Germany

[73] Assignee: GEA Luftkühler GmbH, Bochum, Fed. Rep. of Germany

[21] Appl. No.: 646,689

[22] Filed: Jan. 25, 1991

[30] Foreign Application Priority Data

Jan. 27, 1990 [DE] Fed. Rep. of Germany ....... 4002434

[51] Int. Cl.$^5$ .................... C01B 17/69; C01B 21/20
[52] U.S. Cl. .................... 423/242; 423/235; 423/522; 422/173; 55/73; 165/913
[58] Field of Search .......... 423/522, DIG. 2, 235, 423/242 A, 242 R; 55/73, 222, DIG. 15; 422/161, 173; 165/913, 921

[56] References Cited

U.S. PATENT DOCUMENTS

| | | | |
|---|---|---|---|
| 4,444,128 | 4/1984 | Monro | 110/345 |
| 4,612,024 | 9/1986 | Muller-Odenwald | 55/73 |
| 4,799,941 | 1/1989 | Westermark | 55/90 |
| 4,910,011 | 3/1990 | Dörr | 423/522 |
| 4,943,473 | 7/1990 | Sahatjian | 428/245 |

FOREIGN PATENT DOCUMENTS 60-221306  11/1985  Japan ..................... 422/161

Primary Examiner—Gary P. Straub
Assistant Examiner—Timothy C. Vanoy
Attorney, Agent, or Firm—Toren, McGeady & Associates

[57] ABSTRACT

A method and an apparatus for the denitrification and desulfurization of hot waste gases, particularly from furnaces. A crude gas flow is initially conducted through a denitrification plant and through the endothermic part of a heat-utilizing plant. Subsequently, the flow is conducted into a desulfurization plant. The purified gas flow discharged from the desulfurization plant is conducted through the exothermic part of the heat-utilizing plant and is subsequently transferred to ambient. By means of a cooling trap, a portion of the heat contained in the crude gas flow before the contact with the heat-utilizing plant is removed while precipitating sulfuric acid in the form of vapor, and this heat is then added to the purified gas flow before the contact thereof with the heat-utilizing plant. Another cooling trap connected to an external cooling unit may be arranged in the crude gas flow between the cooling trap arranged in the crude gas flow in front of the heat-utilizing plant and the endothermic part of the heat-utilizing plant.

15 Claims, 8 Drawing Sheets

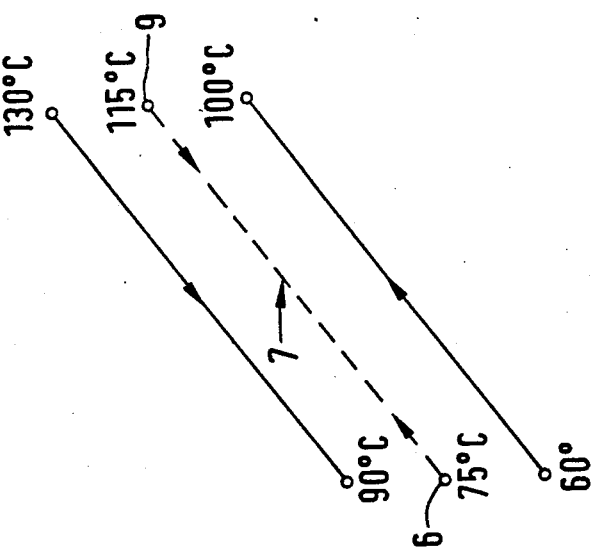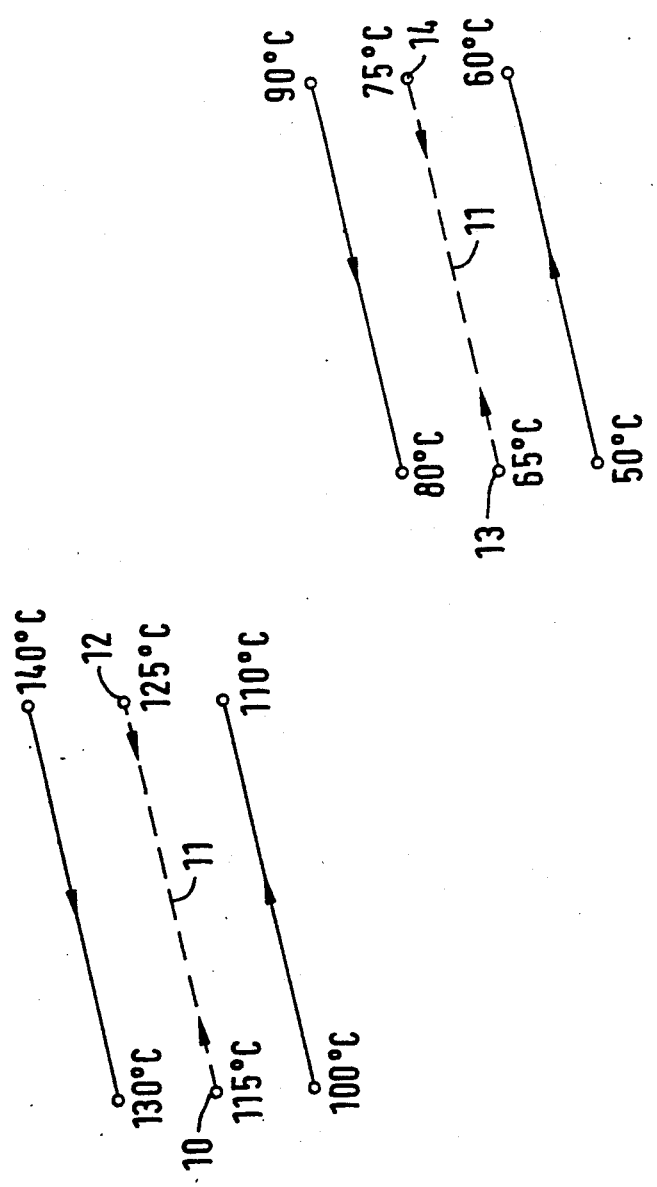
FIG.2

METHOD AND ARRANGEMENT FOR THE DENITRIFICATION AND DESULFURIZATION OF HOT WASTE GASES, PARTICULARLY FROM FURNACES

BACKGROUND OF THE INVENTION

1. Field of the Invention

The present invention relates to a method for the denitrification and desulfurization of hot waste gases, particularly from furnaces. The method includes initially conducting a crude gas flow through a denitrification plant and through the endothermic part of a heat-utilizing plant. Subsequently, the flow is conducted into a desulfurization plant. The purified gas flow discharged from the desulfurization plant is conducted through the exothermic part of the heat-utilizing plant and is subsequently transferred to ambient.

The present invention also relates to an arrangement for the denitrification and desulfurization of hot waste gases, particularly from furnaces. The arrangement includes a crude gas flow conduit which is conducted through a denitrification plant and through the endothermic part of a heat-utilizing plant. The crude gas flow conduit is also connected to a desulfurization plant. A purified gas flow conduit downstream of the desulfurization plant is conducted through the exothermic part of the heat-utilizing plant.

2. Description of the Related Art

Large coal power plants are operated today almost exclusively with desulfurization plants for waste gases. During the combustion process in the power plant, the sulfur from the coal is converted to sulfur dioxide $SO_2$. The sulfur dioxide is removed from the waste gases in the desulfurization plant to prevent it from reaching the atmosphere. In the atmosphere, the sulfur dioxide can oxidize to $SO_3$ under the influence of sunlight and due to long-term effects. The $SO_3$, in turn, reacts with the water vapor of the atmosphere to sulfuric acid and, thus, is responsible to a significant extent for damages to the environment due to acid, for example, damage to forests.

In addition to $SO_2$, the combustion process also produces $SO_3$ directly to a very small extent. The $SO_3$ is combined already within the combustion plant with water vapor to form $H_2SO_4$ which is subjected together with the waste gases to the entire process and then reaches the atmosphere.

While $SO_2$ is removed in the desulfurization plant to a high extent (usually over 90%), the degree of removal for $SO_3$ or $H_2SO_4$ in vapor form is substantially poorer. It is usually lower than 50%.

In most cases, the desulfurization is performed by spraying or dripping the $SO_2$-containing waste gases with milk of lime or similar washing solutions which contain absorbing agents.

Although the very small molecules of $SO_3$ or $H_2SO_4$ in the form of gas or vapor pass through the desulfurization plant to a large extent without being removed, the effect on the environment is still low because only small amounts of these molecules are released during the normal combustion process.

More recently, waste gases (crude gases) from furnaces are not only desulfurized but also additionally denitrified. This means that the nitric oxide $NO_x$ which is contained in the waste gases and is produced by the combustion is also removed. This is because it has been found that $NO_x$ is converted to acids in the atmosphere under the influence of sunlight and, consequently, is also responsible for environmental damage.

The denitrification is carried out by adding ammonia $NH_3$ to the waste gases. The ammonia converts the nitric oxide in a catalyst to molecular nitrogen $N_2$ and water vapor $H_2O$.

Since significantly higher temperatures are required for this catalytic reaction than for the desulfurization, the denitrifying process is frequently carried out before the desulfurization. The waste gases to be purified arrive with the required high temperature of about 350° C. directly from the boiler or furnace and are conducted after denitrification with an almost unchanged temperature directly to a heat-utilizing plant.

A heat-utilizing plant between the denitrification plant and the desulfurization plant is also required because the desulfurization plant requires temperatures of the waste gases for the washing process which are substantially below 100° C.

A heat-utilizing plant which is frequently used is a rotating heat retainer which removes the heat energy from the waste gases which flow through hollow spaces of the heat retainer. The heat retainer stores and later releases the heat energy to the same or another gas flow, particularly to the purified gas which is discharged from the desulfurization plant.

As a result, the hot waste gases are cooled, while the part of the heat retainer which is in contact with the waste gases is heated. On the other hand, the cold purified gas is heated, while the part of the heat retainer which is in heat-exchanging contact with the purified gas is cooled. Such a rotating heat retainer is generally called a regenerator. Because of its purpose of later reheating the cold gas flow, the heat retainer is also called a gas preheater.

Since the waste gases to be desulfurized have to be cooled before entering the desulfurization plant and the purified gas must be heated again after leaving the desulfurization plant, so that moisture damage in the stack is avoided, it is apparent that the gas preheater should be used for this purpose, for cooling the waste gases in front of the desulfurization plant and for heating the purified gas following the desulfurization plant.

However, after the first denitrification plants to be arranged in front of a desulfurization plant were started to operate, it was found that now substantially more $SO_3$ was contained in the waste gases which reacted with the water vapor of waste gases to sulfuric acid. This substantially greater proportion of sulfuric acid in the waste gases resulted in a relatively high sulfuric acid dew point and, thus, in a precipitation of liquid sulfuric acid when the gas was cooled in the gas preheater in front of the desulfurization plant. This resulted in substantial corrosion of the gas preheater due to the precipitated liquid sulfuric acid and simultaneously in a contamination of the clean purified gas emerging from the desulfurization plant when passing through the gas preheater due to corrosion particles from the heat retainer.

Further tests have shown that the increased $SO_3$ portion in the waste gases is due to the catalytic effect of the $NO_x$ catalyst where a portion of the $SO_2$ gas is catalytically converted to $SO_3$.

In addition to the significant corrosion damage to the gas preheater due to the high content of sulfuric acid, an increased portion of sulfuric acid travels through the desulfurization plant. This portion reaches the stack and, thus, is admitted to the atmosphere. Another portion of the liquid sulfuric acid precipitated at the gas preheater is again vaporized when the purified gas is reheated and, thus, travels also directly from the heat retainer of the gas preheater into the clean purified gas flow and through the stack into the atmosphere.

The high sulfuric acid content in the purified gas contradicts not only the previous efforts for cleaning the waste gases, but also leads relatively quickly to drop precipitation of the sulfuric acid-containing purified gas which is cooled quickly when leaving the stack and, thus, together with the corrosion particles from the gas preheater, leads to a direct and substantial burden on the immediate surroundings.

While it would theoretically be possible to prevent the $SO_3$-conversion in the catalyst by means of completely new catalysts, this can only be a long term solution. In addition, such a development will require extremely high and unforeseeable costs.

SUMMARY OF THE INVENTION

It is the object of the present invention to provide a method and an arrangement for the denitrification and desulfurization of hot waste gases, particularly from furnaces, in which in a simple manner a substantial portion of the sulfuric acid contained in the waste gases or crude gases in the form of vapor can be removed.

In accordance with the present invention, the above-described method for the denitrification and desulfurization of waste gases includes the steps of removing a portion of the heat contained in the crude gas flow before the contact with the heat-utilizing plant, while precipitating sulfuric acid in the form of vapor, and adding this heat to the purified gas flow before the contact thereof with the heat-utilizing plant.

Since heat is withdrawn from the crude gas flow, particularly in a rotating heat container or gas preheater, before the crude gas flow enters the heat-utilizing plant, a large amount of sulfuric acid in the form of vapor is removed from the crude gas and, thus, is removed from the process.

Since the sulfuric acid dew point of the crude gas with the increased conversion rate of the $SO_3$ in the catalyst is approximately 130° C., it is in many cases sufficient to lower the temperature of the crude gas by 10° C. to 20° C. in order to remove a substantial amount of sulfuric acid from the crude gas and to keep the sulfuric acid away from the gas preheater.

The quantity of the sulfuric acid which can be removed increases as the temperature is lowered. However, for economical reasons, it will be attempted to leave the quantity of heat which has been removed from the crude gas in the process and to return the heat to the purified gas after the desulfurization. As a result, it can be simultaneously prevented that this portion of the heat supply must be carried out by the gas preheater whose possibly acid-wet mass vaporizes a portion of the sulfuric acid.

In accordance with another solution provided by the present invention, the method for the denitrification and desulfurization of hot waste gases includes removing from the crude gas flow a portion of the heat contained in the crude gas flow before the contact with the heat-utilizing plant, while precipitating sulfuric acid in the form of vapor, and adding the heat removed from the crude gas flow to the purified gas flow after the contact with the heat-utilizing plant, and removing from the crude gas flow another portion of the heat contained in the crude gas flow after the contact with the heat-utilizing plant, while precipitating sulfuric acid in the form of vapor, and adding the further portion of heat to the purified gas flow before the contact with the heat-utilizing plant.

Thus, in accordance with the latter solution, the entire heat removed at the crude gas side is returned on the purified gas side, so that no heat energy is lost. The liquid sulfuric acid which is produced by the heat removal in front of and following the gas preheater is immediately conducted away and eliminated from the entire system.

In accordance with the present invention, the arrangement for carrying out the above-described method includes a cooling trap provided in the crude gas flow conduit in the direction of flow of the crude gas in front of the heat-utilizing plant. The cooling trap is connected by fluid-conducting means to a heating part which is provided in the purified gas flow conduit.

Thus, the heat removed from the crude gas in the cooling trap to which the crude gas flow is conducted before the contact with the gas preheater is again returned in a heating part to the purified gas flow emerging from the desulfurization plant. The arrangement of the cooling trap in front of the gas preheater prevents damage to the gas preheater because a large quantity of the sulfuric acid in the form of vapor is precipitated in the cooling trap. Simultaneously, a heating part is added which prevents from again evaporating the sulfuric acid droplets precipitated in the gas preheater. The important aspect is the fact that particularly the cooling trap provided in the crude gas flow in front of the gas preheater in flow direction of the crude gas only slightly cools the crude gas but removes a significant amount of moisture from the crude gas. This removal of moisture also includes the removal of sulfuric acid in the form of vapor or liquid. Within the scope of the invention, the surface of the cooling trap is kept as cold as possible and is made of a material which resists the corrosive attacks of the sulfuric acid.

Since the sulfuric acid dew point of waste gases from furnaces with increased conversion rate of the $SO_3$ in the catalyst is in the range of approximately 130° C., to remove a substantial amount of the sulfuric acid from the crude gas and to keep the sulfuric acid from the gas preheater it is in many cases sufficient to keep the wall temperature of the cooling trap between 100° C. and 120° C. However, a wall temperature which is as low as possible is desired because then the greatest amount of sulfuric acid can be precipitated. On the other hand, it is desired to leave the amount of heat removed from the gas preheater in the cooling trap in the process and to return the heat to the purified gas flow after the desulfurization plant. This provides the advantage that it is prevented that this portion of the heat supply must be carried out by the gas preheater whose possibly acid-wet mass again vaporizes a portion of this sulfuric acid.

In accordance with an advantageous feature of the invention, the heating part provided in the purified gas flow conduit is arranged in front of the heat-utilizing plant in flow direction of the purified gas. Accordingly, only one cooling trap is arranged in the crude gas flow in front of the gas preheater in flow direction of the crude gas and is connected in a fluid-conducting manner to a heating part which is also arranged in the purified gas flow conduit in front of the gas preheater in flow direction of the purified gas. The cooling trap arranged in the crude gas flow should be of reinforced construction in this case. The cooling trap discharges the absorbed heat energy to the purified gas with the coldest temperature and heats the purified gas from about 50° C. to 70° C. In this embodiment, the temperatures are between 105° C. for the heating part provided in the purified gas flow conduit and approximately 85° C. in the cooling trap provided in the crude gas flow conduit. This temperature is determined by the cold purified gas flow.

In accordance with another advantageous embodiment of the invention, the cooling trap arranged in the crude gas flow conduit in front of the heat-utilizing plant in flow direction of the crude gas is connected by fluid-conducting means to a heating part which is provided in the purified gas flow behind the heat-utilizing plant in flow direction of the purified gas and a cooling trap arranged in the crude gas flow behind the heat-utilizing plant in flow direction of the crude gas is connected by fluid-conducting means to a heating part arranged in the purified gas flow conduit in front of the heat-utilizing plant in flow direction of the purified gas. In this case, while the efficiency of the entire arrangement is the same, the mass temperature of the gas preheater varies only between 75° C. in the endothermic part and 115° C. in the exothermic part. In this arrangement, the entire heat removed by the cooling traps arranged in the crude gas flow in front of and behind the gas preheater is reintroduced on the purified gas side. Accordingly, the heat energy is not lost. In this embodiment, the surface temperature of the cooling traps and heating parts which are connected to each other by fluid-conducting means in front of and behind the gas preheater are between 115° C. and 125° C. in front of the gas preheater and between 65° C. and 75° C. behind the gas preheater.

Another feature of the invention provides that the cooling traps and the heating parts have the same size.

In accordance with another feature, the cooling trap arranged in the crude gas flow conduit in front of the heat-utilizing plant in flow direction of the crude gas is smaller than the heating part arranged in the purified gas flow conduit in front of the heat-utilizing plant.

In another embodiment of the invention, the cooling trap arranged in the crude gas flow in front of the heat-utilizing plant in flow direction of the crude gas is smaller than the heating part in the purified gas flow conduit which is connected by fluid-conducting means to the cooling trap, and the cooling trap arranged in the crude gas flow behind the heat-utilizing plant in flow direction of the crude gas is greater than the heating part arranged in the purified gas flow conduit in front of the heat-utilizing plant in flow direction of the purified gas. The sizes of the heating parts are inversely proportional. The different sizes of cooling traps and heating parts which are in heat transferring contact with each other leads to a desired influence on the cooling trap temperature. The small cooling trap in front of the gas preheater in conjunction with the large heating part in the purified gas flow following the gas preheater leads to a lowering of the cooling trap temperature in front of the gas preheater and to an increase behind the gas preheater relative to apparatus of equal size for the cooling traps and heating parts.

Another embodiment of the invention provides that, in flow direction of the crude gas between the cooling trap arranged in the crude gas flow conduit in front of the heat-utilizing plant and the endothermic part of the heat-utilizing plant, another cooling trap is arranged in the crude gas flow which cooling trap can be connected by fluid-conducting means to an external cooling unit. The additional external cooling unit serves to obtain very low cooling trap temperatures for those cases in which the crude gas is to be freed of sulfuric acid to an extremely great extent. Specifically, another cooling trap connected to an external cooling unit is arranged in front of the gas preheater and following the normal cooling trap which is arranged in the crude gas flow in front of the gas preheater in flow direction of the crude gas, wherein the normal cooling trap cools the crude gas from 140° C. to 130° C. with a cooling trap temperature between 60° C. and 70° C. which is obtained from the cold purified gas flow in the area in front of the gas preheater, wherein this purified gas flow is heated from 50° C. to 60° C. The additional cooling trap cools the cooled gas from 130° C. to 125° C., however, the cooling trap temperature is between 25° C. and 27° C. which is obtained from the external cooling unit.

However, the resulting heat removal from the entire system is not economical over the long term. Consequently, the invention provides the possibility of arranging the additional cooling trap in series with the normal cooling trap, so that the external cooling unit becomes necessary only temporarily when the conditions are particularly unfavorable with respect to the acid content of the crude gas.

The cooling unit may be a component of a cooling tower, particularly a wet cooling tower. In accordance with a further feature of the present invention, connecting lines which are connected to the normal cooling trap in front of the additional cooling trap in the crude gas flow are also connected to transfer lines between the external cooling unit and the additional cooling trap.

Valves are arranged in the connecting lines as well as in the transfer lines between the cooling unit and the connecting points to the connecting lines. This makes it possible to operate the above-described embodiment of a cooling trap arrangement as a purely internal cooling trap with heat transfer to the heating side as well as a mixed arrangement with partial return of the heat to the heating side and partial discharge to an external cooling unit, for example, a wet cooling tower.

At least the cooling traps are hoses or pipes of a corrosion-proof and anti-adhesive plastic material. Specifically, the cooling traps and the transfer lines between the cooling traps and the heating parts are of polytetrafluoroethylene, polyvinyliden fluoride or polypropylene or are coated with these materials. The surface properties of these materials provide an excellent conduction of the viscous sulfuric acid and ensure that the heat exchanger surfaces stay clean. The strongly anti-adhesive properties of such plastic materials have the result that only small amounts of water are required for cleaning these surfaces by washing. The moisture precipitation from the crude gas itself is even frequently sufficient.

Depending on local requirements, the cooling traps, the heating parts and the transfer lines between the cooling traps and the heating parts can also be formed by the heat pipes.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 2 is a temperature diagram of the arrangement of FIG. 1;

DESCRIPTION OF THE PREFERRED EMBODIMENT

Figure 1:
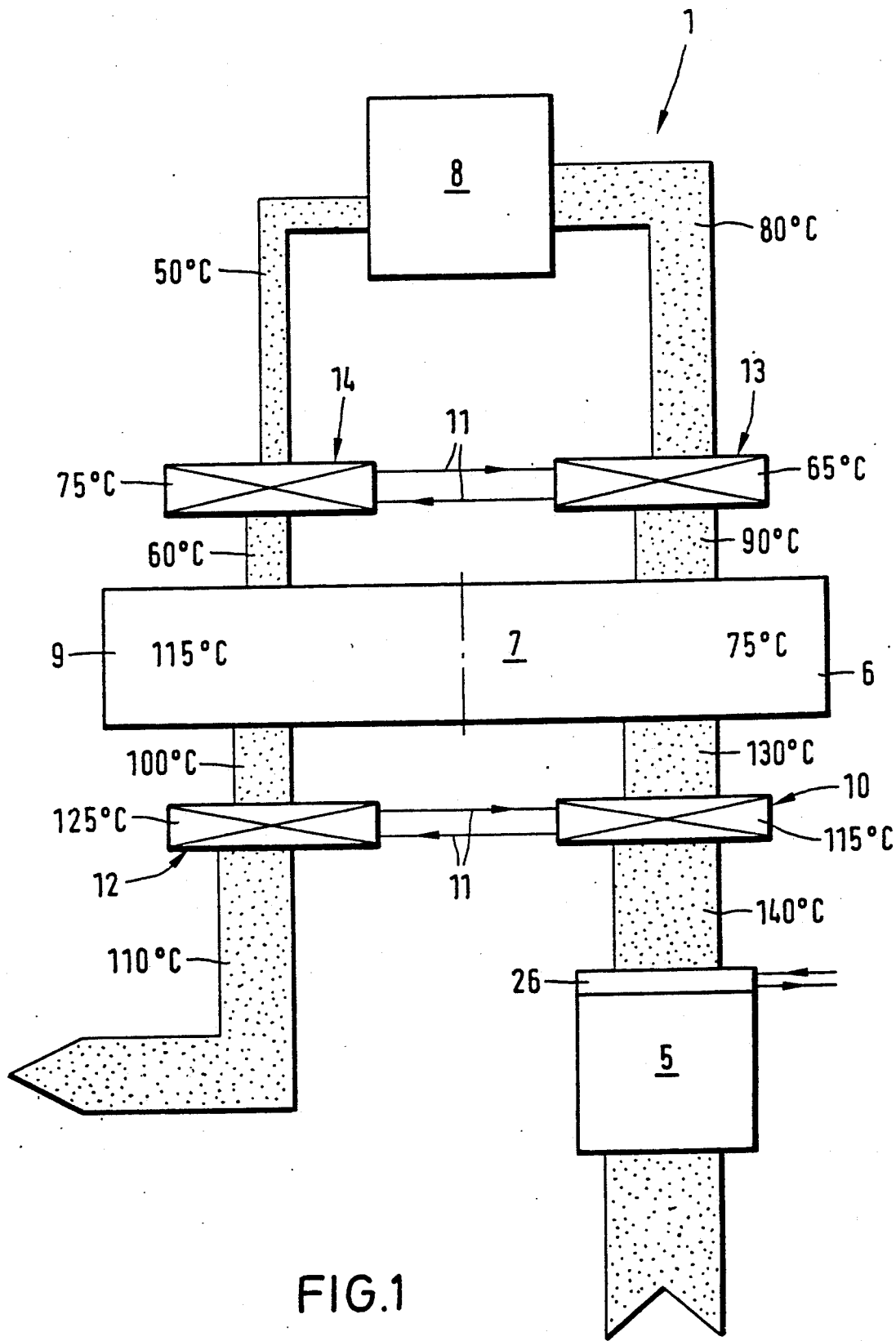
FIG. 1 is a schematic view of an arrangement for the denitrification and desulfurization of crude gases.

In FIGS. 1-8 of the drawing, ROG identifies a crude gas flow produced, for example, by the combustion process in a coal power plant. In all four arrangements 1, 2, 3 and 4 of FIGS. 1, 3, 5 and 7, the crude gas flow ROG is conducted through a denitrification plant 5 and the endothermic part 6 of a regenerator for gas preheating, i.e., a gas preheater 7. Subsequently, the crude gas flow ROG is conducted into a desulfurization plant 8. A purified gas flow REG is discharged from the desulfurization plant 8. The purified gas flow REG is conducted through the exothermic part 9 of the gas preheater 7, then into the stack, not illustrated in detail, and from there to ambient.

In the embodiments of FIGS. 1 and 2, a cooling trap 10 is provided between the denitrification plant 5 and the endothermic part 6 of the gas preheater 7. The cooling trap 10 is made of hoses or pipes of polytetrafluoroethylene. The cooling trap 10 arranged in the crude gas flow ROG is connected through transfer lines 11 of polytetrafluoroethylene to a heating part 12 which is arranged in the purified gas flow REG behind the gas preheater 7 in flow direction of the purified gas. The heating part 12 may also be made of hoses or pipes of polytetrafluoroethylene.

As FIG. 1 of the drawing further shows, another cooling trap 13 is arranged in flow direction of the crude gas ROG between the endothermic part 6 of the gas preheater 7 and the desulfurization plant 8. The cooling trap 13 is also made of hoses or pipes of polytetrafluoroethylene. The cooling trap 13 is connected by fluid-conducting means through transfer lines 11 of polytetrafluoroethylene to a heating part 14 which is arranged in the purified gas flow REG between the desulfurization plant 8 and the exothermic part 9 of the gas preheater 7. This heating part 14 may also include hoses or pipes of polytetrafluoroethylene.

When considering FIGS. 1 and 2 of the drawing together, it can also be seen that the crude gas flow ROG from the denitrification plant 5 is conducted to the cooling trap 10 with a temperature of about 140° C. and leaves the cooling trap 10 with a temperature of about 130° C. The crude gas flow ROG is then admitted to the gas preheater 7 where heat is stored, so that this heat is removed from the crude gas flow ROG and the crude gas flow ROG leaves the gas preheater 7 with a temperature of about 90° C.

The crude gas flow ROG is then admitted with this temperature of 90° C. to the cooling trap 13 in which the crude gas flow ROG again loses heat, so that it leaves the cooling trap 13 with a temperature of about 80° C. and is admitted with this temperature to the desulfurization plant 8.

The purified gas flow REG leaves the desulfurization plant 8 with a temperature of about 50° C. and is heated in the heating part 14 to 60° C. and the purified gas flow REG then flows with this temperature through the exothermic part 9 of the gas preheater 7. In the gas preheater 7, the purified gas flow REG is heated to about 100° C. The purified gas flow REG is admitted with this temperature to the heating part 12 to about 110° C. and is conducted with this temperature to the stack, not illustrated in detail.

As FIGS. 1 and 2 further show, the cooling trap temperature in front of the gas preheater 7 is about 115° C. behind the gas preheater 7, while the temperature of the heating part 14 in front of the gas preheater 7 in flow direction of the purified gas is about 75° C. and is about 125° C. behind the gas preheater 7.

The temperature of the gas preheater 7 ranges from about 75° C. in the endothermic part 6 and about 115° C. in the exothermic part 9.

Due to the arrangement of the cooling traps 10 and 13 in front of and behind the gas preheater 7, a large quantity of sulfuric acid in the form of vapor can be precipitated at the cooling traps 10, 13, so that corrosion of the gas preheater 7 is avoided and no damaging sulfuric acid can reach the atmosphere with the purified gas flow REG.

In the embodiment of FIGS. 1 and 2, the cooling traps 10, 13 and the heating parts 12, 14 all have the same size.

Figure 3:
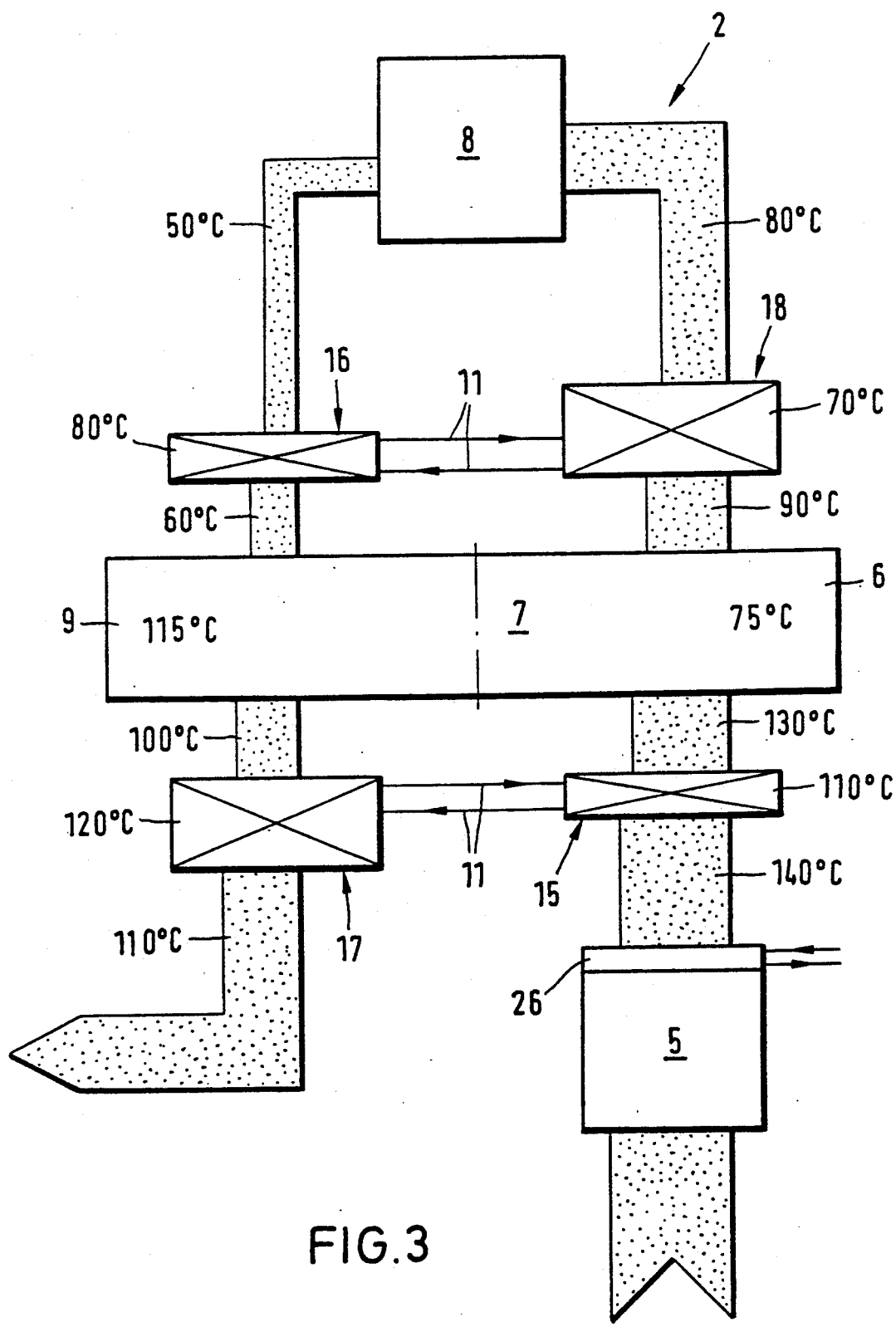
FIG. 3 is a schematic view of a second embodiment of an arrangement for the denitrification and desulfurization of crude gases.
Figure 4:
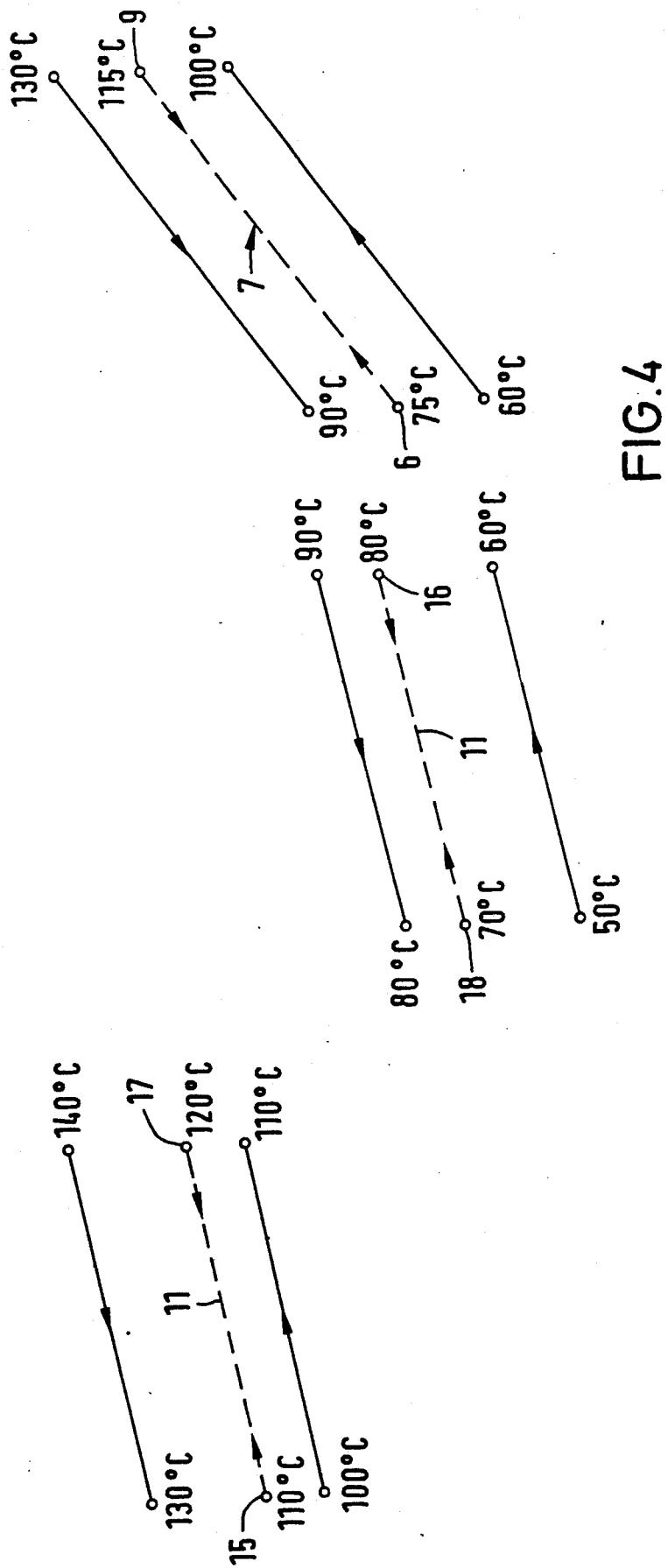
FIG. 4 is a temperature diagram of the arrangement of FIG. 3.

By contrast, in the arrangement 2 of FIGS. 3 and 4, the cooling trap 15 arranged in the crude gas flow ROG in front of the gas preheater 7 in flow direction of the crude gas as well as the cooling trap 16 arranged in the purified gas flow REG in front of the gas preheater 17 in flow direction of the purified gas are smaller than the heating parts 17, 18 which are connected by fluid-conducting means through transfer lines 11 to these cooling traps 15, 16. The heating parts 17, 18 are arranged behind the gas preheater 7 in flow direction of the crude gas flow ROG or the purified gas flow REG, respectively.

The different size of the cooling traps 15, 16 in relation to the heating parts 17, 18 provides the possibility of influencing as desired the cooling trap temperature.

The cooling traps 15, 16 and the heating parts 17, 18 as well as the transfer lines 11 may be of the same construction as the corresponding components of the embodiment of FIGS. 1 and 2.

Figure 5:
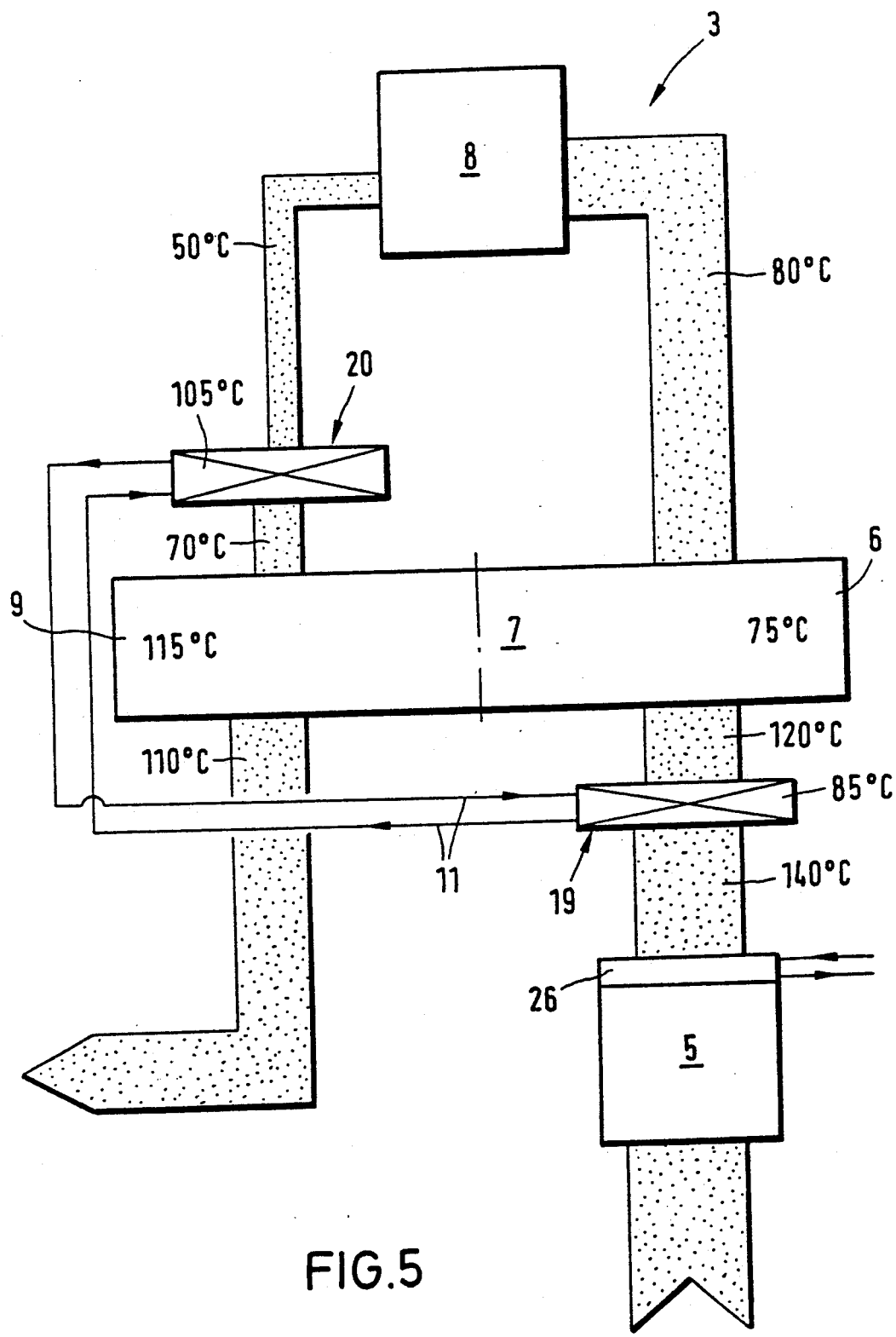
FIG. 5 is a schematic view of a third embodiment of an arrangement for the denitrification and desulfurization of crude gases.

The arrangement 3 according to FIGS. 5 nd 6 includes a cooling trap 19 which is arranged in the crude gas flow ROG in flow direction of the crude gas between the denitrification plant 5 and the endothermic part 6 of the gas preheater 7.

The cooling trap 19 is in connection by fluid-conducting means through transfer lines 11 to a heating part 20 which is arranged in the purified gas flow REG in flow direction of the purified gas between the desulfurization plant 8 and the exothermic part 9 of the gas preheater 7.

Figure 6:
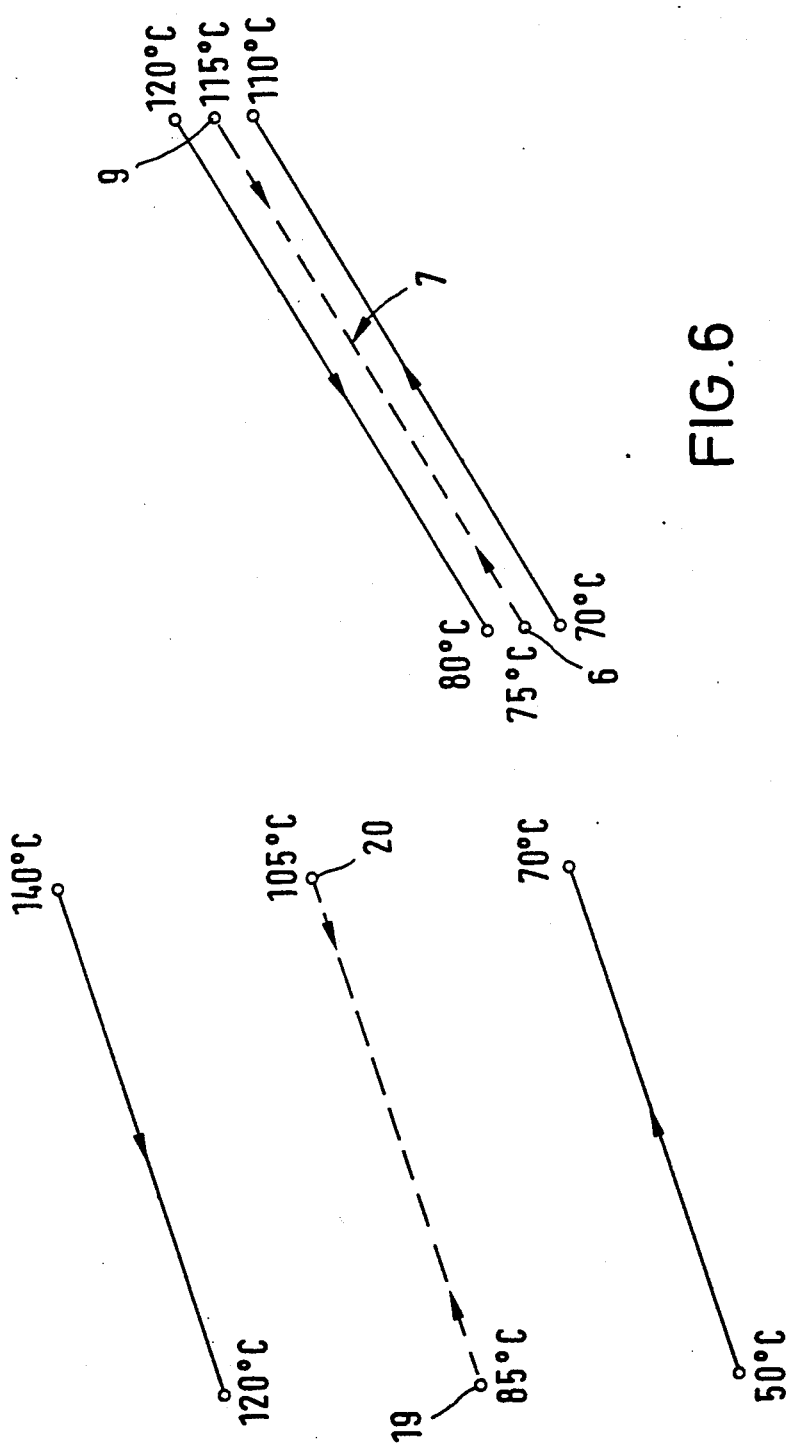
FIG. 6 is a temperature diagram of the arrangement of FIG. 5.

In the embodiment of FIGS. 5 and 6, the cooling trap 19 as well as the heating part 20 are equipped with hoses or pipes of polytetrafluoroethylene. The transfer lines 11 between the cooling trap 19 and the heating part 20 are also of polytetrafluoroethylene. The heat exchange medium in the circulation between cooling trap 19 and heating part 20 advantageously is water, as is the case in the arrangements 1 and 2 described above.

The crude gas flow ROG from the denitrification plant 5 is admitted to the cooling trap 19 with a temperature of about 140° C., as shown in FIGS. 5 and 6. When leaving the cooling trap 19, the crude gas flow ROG has a temperature of about 120° C. This temperature is reduced to about 80° C. in the endothermic part 6 of the gas preheater 7. The crude gas flow ROG enters with this temperature the desulfurization plant 8.

The purified gas flow REG leaves the desulfurization plant 8 with a temperature of about 50° C. By the heat exchange with the heating part 20, the purified gas flow REG is heated to about 70° C. The purified gas flow REG then flows with this temperature through the exothermic part 9 of the gas preheater 7 and is further heated to about 110° C. The purified gas flow REG is then conducted with this temperature through a stack, not shown, to ambient.

As can also be seen in FIGS. 5 and 6, the temperature of the gas preheater 7 in the endothermic part 6 is about 75° C. and in the exothermic part 9 the temperature is about 115° C.

The temperature of the cooling trap 19 is about 85° C., while the temperature of the heating part 20 is about 105° C.

The cooling trap 19 as well as the heating part 20 may be of identical size. However, it is also conceivable that, as in the embodiment of arrangement 2 shown in FIGS. 3 and 4, the cooling trap 19 is smaller than the heating part 20.

Figure 7:
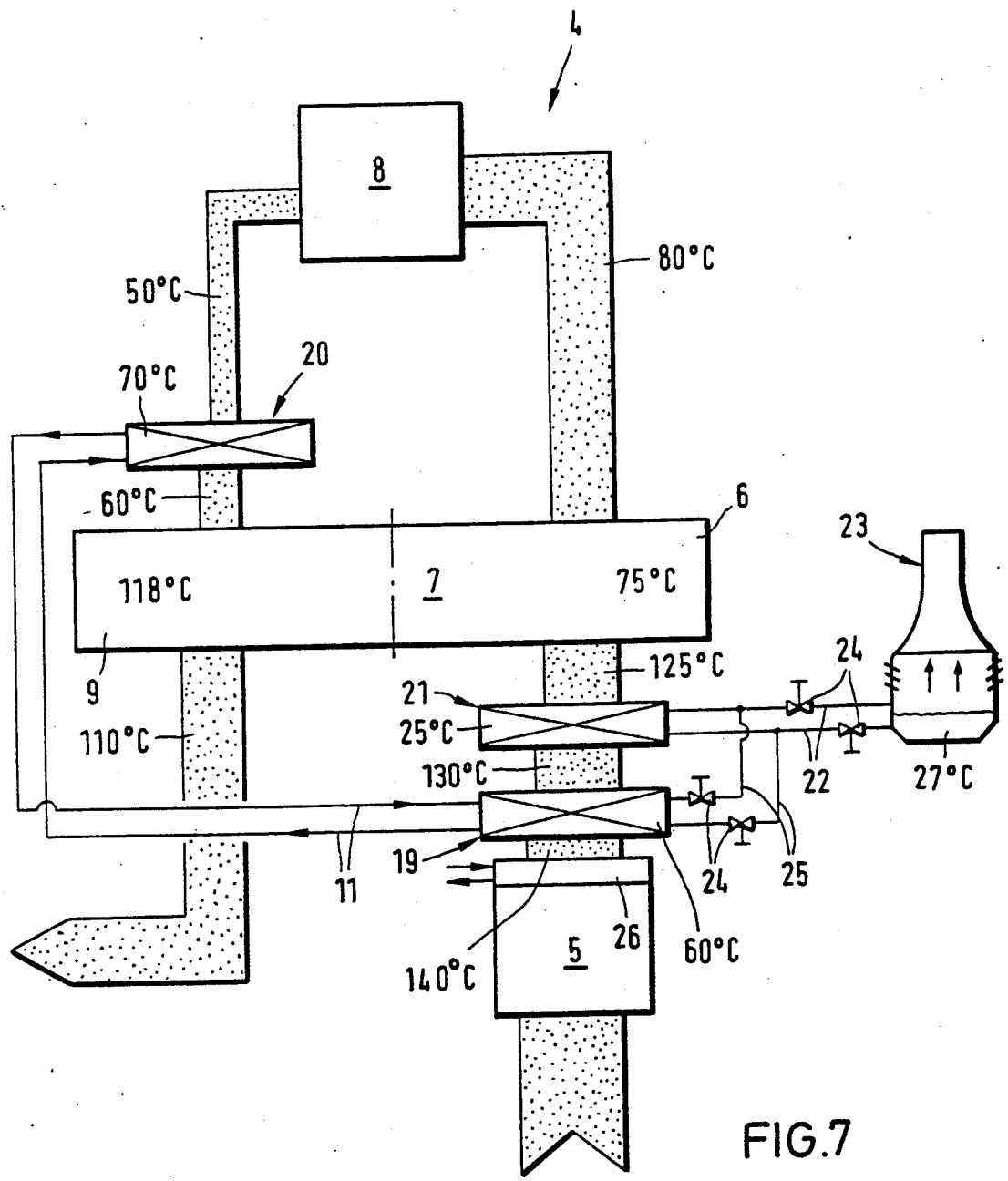
FIG. 7 is a schematic view of a fourth embodiment of an arrangement for the denitrification and desulfurization of crude gases.
Figure 8:
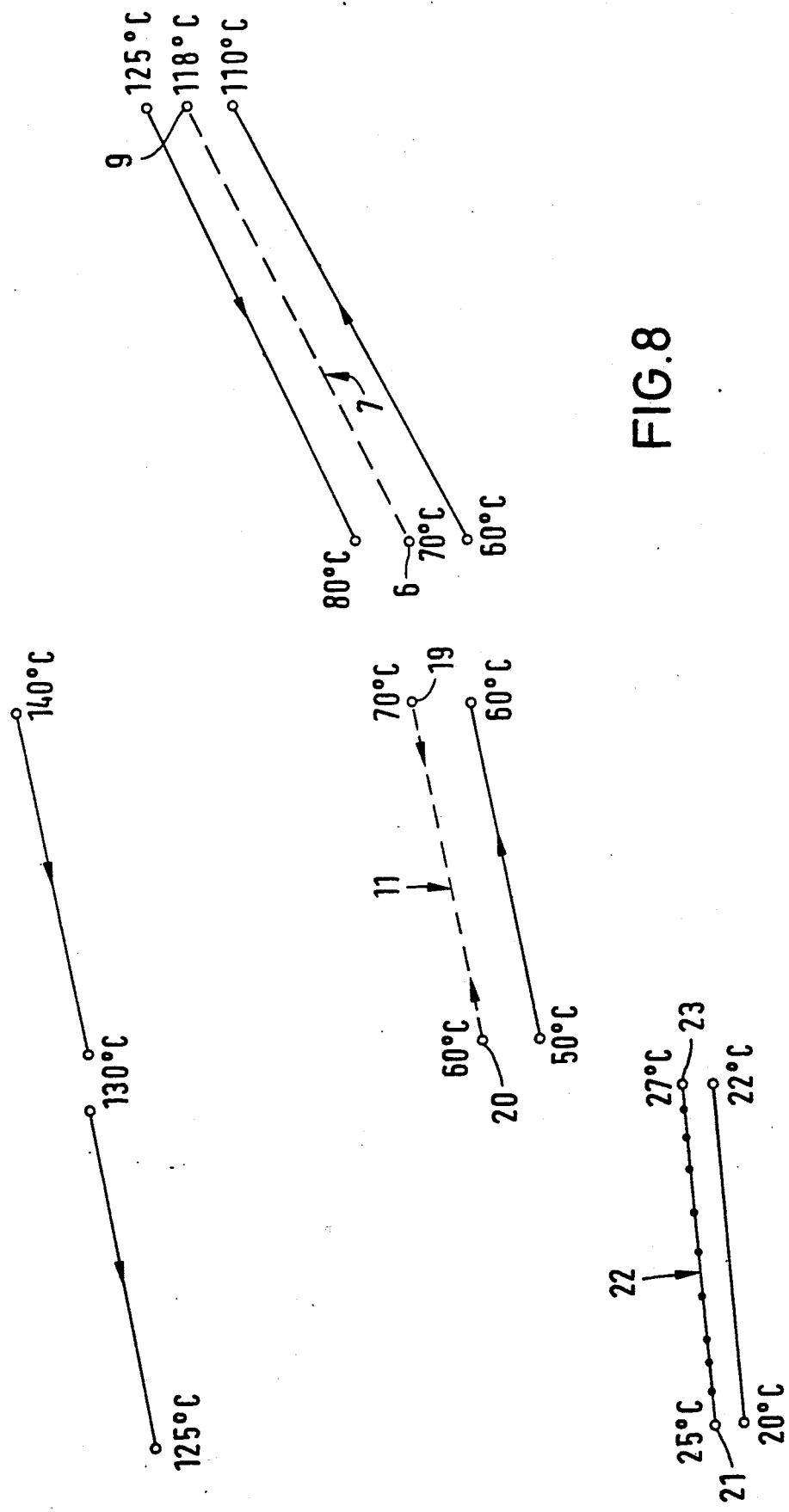
FIG. 8 is a temperature diagram of the arrangement of FIG. 7.

Finally, FIGS. 7 and 8 show an arrangement 4 with cooling traps in which, as in the embodiment of FIGS. 5 and 6, a cooling trap 19 is arranged in the crude gas flow ROG between the denitrification plant 5 and the endothermic part 6 of the gas preheater 7 and a heating part 20 in the purified gas flow REG between the desulfurization plant 8 and the exothermic part 9 of the gas preheater 7, wherein the cooling trap 19 and the heating part 20 are connected by fluid-conducting means through transfer lines 11.

The arrangement 4 has an additional cooling trap 21 in the crude gas flow ROG between the cooling trap 19 arranged after the denitrification plant and the endothermic part 6 of the gas preheater 7. This additional cooling trap 21 is connected through transfer lines 22, for example, to a wet cooling tower 23. Valves 24 are arranged in the transfer lines 22.

As FIG. 7 additionally shows, connecting lines 25 are connected to the transfer lines 22 between the cooling trap 21 and the wet cooling tower 23, wherein the connecting lines lead to the normal cooling trap 19. Valves 24 are also arranged in the connecting lines 25.

Accordingly, depending on the positions of the valves 24, the arrangement 4 of FIGS. 7 and 8 can be operated as a purely internal cooling trap with complete heat transfer to the heating part 20, or it can be operated as a mixed arrangement with only partial transfer of the heat to the heating part 20 and can be transferred to the external wet cooling tower 23.

As in the above-described embodiments, the cooling traps 19, 21 of FIG. 7 also include pipes or hoses of polytetrafluoroethylene. The transfer lines between the cooling trap 19 and the heating part 20, the transfer lines 22 between the cooling trap 21 and the wet cooling tower 23, and the connecting line 25 between the transfer lines 22 and the cooling trap 19 can also be made of polytetrafluoroethylene.

As FIGS. 7 and 8 further show, the crude gas flow ROG flows to the cooling trap 19 with a temperature of about 140° C. The crude gas flow ROG emerges from the cooling trap 19 with a temperature of about 130° C. and flows with this temperature into the additional cooling trap 21 and leaves this additional trap 21 with a temperature of about 125° C.

Subsequently, the crude gas flow ROG enters the endothermic part 6 of the gas preheater 7 and leaves the gas preheater 7 with a temperature of about 80° C. which is also the temperature with which the crude gas flow ROG enters the desulfurization plant 8.

The purified gas flow REG leaves the desulfurization plant 8 with a temperature of about 50° C. and is admitted with this temperature to the heating part 20. The purified gas flow REG then leaves the heating part 20 with a temperature of about 60° C.

The purified gas flow REG subsequently flows through the exothermic part 9 of the gas preheater 7 and leaves the latter with a temperature of about 110° C. The purified gas flow REG is then conducted with this temperature to a stack, not shown, and to the atmosphere.

The cooling trap 19 has a temperature of about 60° C. and the heating part 20 which is connected to the cooling trap 19 through fluid-conducting means has a temperature of about 70° C.

The temperature of the gas preheater 7 is about 75° C. in the endothermic part 6 and about 118° C. in the exothermic part 9.

The cooling trap 21 has a lowest wall temperature of about 25° C., while the cooling water arriving from the wet cooling tower 23 has a temperature of about 20° C. and is heated to about 22° C.

For completeness' sake, it is mentioned that in FIGS. 1, 3, 5 and 7, reference numeral 26 denotes a heat uncoupling means which raises the temperature of the crude gas flow ROG to about 140° C.

While a specific embodiment of the invention has been shown and described in detail to illustrate the application of the inventive principle, it will be understood that the invention may be embodied otherwise without departing from such principles.

We claim:

1. In a method for the denitrification and desulfurization of hot waste gases, the method including initially conducting a crude gas flow through a denitrification plant and through an endothermic part of a heat-utilizing plant, subsequently conducting the flow into a desulfurization plant, conducting the purified gas flow discharged from the desulfurization plant through an exothermic part of the heat-utilizing plant, and subsequently releasing the purified gas flow to ambient, the improvement comprising the steps of removing a portion of the heat contained in the crude gas flow before the contact with the heat-utilizing plant, while partially condensing sulfuric acid in the form of vapor, and adding the heat to the purified gas flow before the contact thereof with the heat-utilizing plant.

2. In a method for the denitrification and desulfurization of hot waste gases, the method including initially conducting a crude gas flow through a denitrification plant and through an endothermic part of a heat-utilizing plant, subsequently conducting the flow into a desulfurization plant, conducting the purified gas flow discharged from the desulfurization plant through an exothermic part of the heat-utilizing plant, and subsequently releasing the purified gas flow to ambient, the improvement comprising the steps of removing a portion of the heat contained in the crude gas flow before the contact with the heat-utilizing plant, while condensing sulfuric acid vapors, and adding the heat to the purified gas flow before the contact thereof with the heat-utilizing plant, and removing from the crude gas flow another portion of the heat contained in the crude gas flow after the contact with the heat-utilizing plant, while partially condensing additional sulfuric acid vapor, and adding the another portion of the heat to the purified gas flow before the contact with the heat-utilizing plant.

3. In an arrangement for the denitrification and desulfurization of hot waste gases the arrangement including a crude gas flow conduit conducted through a denitrification plant and through an endothermic part of a heat-utilizing plant, the crude gas flow conduit also being connected to a desulfurication plant, a purified gas flow conduit downstream of the desulfurization plant being conducted through an exothermic part of the heat-utilizing plant, wherein the improvement comprises a cooling trap provided in the crude gas flow conduit in front of the heat-utilizing plant in the direction of flow of the crude gas, the cooling trap being connected by fluid-conducting loop means containing a fluid to a heating part which is provided in the purified gas flow conduit, whereby the cooling trap acts as a heat exchanger.

4. The arrangement according to claim 3, wherein the heating part provided in the purified gas flow conduit is arranged in front of the heat-utilizing plant in flow direction of the purified gas.

5. The arrangement according to claim 3, wherein the cooling trap arranged in the crude gas flow conduit in front of the heat-utilizing plant in flow direction of the crude gas is connected by fluid-conducting means to the heating part which is provided in the purified gas flow conduit behind the heat-utilizing plant in flow direction of the purified gas, and wherein a cooling trap arranged in the crude gas flow conduit behind the heat-utilizing plant in flow direction of the crude gas is connected by fluid-conducting means to another heating part arranged in the purified gas flow conduit in front of the heat-utilizing plant in flow direction of the purified gas.

6. The arrangement according to claim 5, wherein the cooling traps and the heating parts are of equal size.

7. The arrangement according to claim 3, wherein the cooling trap arranged in the crude gas flow conduit in front of the heat-utilizing plant in flow direction of the crude gas is smaller than the heating part arranged in the purified gas flow conduit in front of the heat-utilizing plant.

8. The arrangement according to claim 5, wherein the cooling trap arranged in the crude gas flow conduit in front of the heat-utilizing plant in flow direction of the crude gas is smaller than the heating part in the purified gas flow conduit which is connected by fluid-conducting means to the cooling trap, and wherein the cooling trap arranged in the crude gas flow behind the heat-utilizing plant in flow direction of the crude gas is greater than the heating part arranged in the purified gas flow conduit in front of the heat-utilizing plant in flow direction of the purified gas.

9. The arrangement according to claim 3, wherein another cooling trap connected by fluid-conducting means to an external cooling unit is arranged in the crude gas flow conduit, the another cooling trap being arranged in flow direction of the crude gas between the cooling trap arranged in the crude gas flow conduit in front of the heat-utilizing plant and the endothermic part of the heat-utilizing plant.

10. The arrangement according to claim 9, wherein the external cooling unit is a component of a cooling tower.

11. The arrangement according to claim 9, wherein connecting lines which are connected to the cooling trap in front of the another cooling trap in the crude gas flow conduit are also connected to transfer lines extending between the external cooling unit and the another cooling trap.

12. The arrangement according to claim 11, wherein at least the cooling traps include hoses or pipes of a corrosion-proof and anti-adhesive plastics material.

13. The arrangement according to claim 11, wherein the cooling trap and the transfer lines between the cooling trap and the heating parts are of polytetrafluoroethylene, polyvinylidene fluoride or polypropylene.

14. The arrangement according to claim 11, wherein the cooling trap and the transfer lines between the cooling traps and the heating parts are coated with polytetrafluoroethylene, polyvinylidene fluoride or polypropylene.

15. The arrangement according to claim 11, wherein the cooling traps, the heating parts and the transfer lines between the cooling traps and the heating parts are portions heat pipes.

* * * * *